US012230102B2

(12) United States Patent
Huke

(10) Patent No.: US 12,230,102 B2
(45) **Date of Patent: *Feb. 18, 2025**

(54) METHOD, SYSTEM, AND COMPUTER PROGRAM PRODUCT FOR INTERACTIVE SPORTS GAME

(71) Applicant: AdrenalineIP, Washington, DC (US)

(72) Inventor: Casey Alexander Huke, Washington, DC (US)

(73) Assignee: AdrenalineIP, Washington, DC (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/297,169

(22) Filed: Apr. 7, 2023

(65) Prior Publication Data

US 2023/0245525 A1 Aug. 3, 2023

Related U.S. Application Data

(63) Continuation of application No. 17/128,543, filed on Dec. 21, 2020, now Pat. No. 11,625,980, which is a continuation-in-part of application No. 16/441,516, filed on Jun. 14, 2019, now Pat. No. 10,872,503, which is a continuation-in-part of application No.

(Continued)

(51) Int. Cl.
*G07F 17/32* (2006.01)

(52) U.S. Cl.
CPC ........ *G07F 17/3244* (2013.01); *G07F 17/323* (2013.01); *G07F 17/3288* (2013.01)

(58) Field of Classification Search
None
See application file for complete search history.

(56) References Cited

U.S. PATENT DOCUMENTS

| | | | |
|---|---|---|---|
| 7,699,701 B2 | 4/2010 | Corbo | |
| 7,736,233 B2 | 6/2010 | Pachnis et al. | |

(Continued)

FOREIGN PATENT DOCUMENTS

| | | |
|---|---|---|
| CN | 104903917 A | 9/2015 |
| CN | 107998661 A | 5/2018 |

(Continued)

OTHER PUBLICATIONS

Notification of Transmittal of the International Search Report and the Written Opinion of the International Searching Authority issued on Aug. 17, 2020, in connection with corresponding International Application No. PCT/US20/33968 (11 pp.).

(Continued)

*Primary Examiner* — Ronald Laneau
(74) *Attorney, Agent, or Firm* — Maier & Maier, PLLC

(57) ABSTRACT

A computer implemented game involving analytics and real time data analysis. The game can allow players to predict and wager on the types of plays that have yet to occur, for example, in a football game. The game may utilize an algorithm that compares situational data in a game to stored data regarding similar situations in past games. The game can then provide a likelihood that a certain type of play can be performed, which may be interpreted as odds of a certain type of play. Users can then utilize this information to predict and wager on the upcoming play. Depending on the results of the play, users may win or lose their wager.

10 Claims, 17 Drawing Sheets

Related U.S. Application Data

16/232,277, filed on Dec. 26, 2018, now Pat. No. 10,395,483.

(60) Provisional application No. 62/609,472, filed on Dec. 22, 2017.

(56) References Cited

U.S. PATENT DOCUMENTS

| | | | | |
|---|---|---|---|---|
| 8,002,618 | B1 | 8/2011 | Lockton et al. | |
| 8,376,855 | B2 | 2/2013 | Lockton et al. | |
| 8,622,816 | B2 | 1/2014 | Gagner et al. | |
| 8,738,694 | B2 | 5/2014 | Huske et al. | |
| 9,205,339 | B2 | 12/2015 | Cibula et al. | |
| 9,224,269 | B2 | 12/2015 | Zacharakis et al. | |
| 9,330,538 | B2 | 5/2016 | Konstakis et al. | |
| 9,545,580 | B2 | 1/2017 | Litos et al. | |
| 9,959,710 | B2 | 5/2018 | Diamantis | |
| 10,304,278 | B2 | 5/2019 | Lyons et al. | |
| 10,395,483 | B2 | 8/2019 | Huke et al. | |
| 10,403,094 | B2 | 9/2019 | Huke et al. | |
| 10,460,568 | B2 | 10/2019 | Givant | |
| D872,763 | S | 1/2020 | Taskell et al. | |
| 10,569,157 | B2 | 2/2020 | Mruk | |
| 10,943,435 | B2 | 3/2021 | Hall et al. | |
| 11,183,027 | B2 | 11/2021 | Hall | |
| 2006/0046807 | A1 | 3/2006 | Sanchez | |
| 2007/0218997 | A1 | 9/2007 | Cho | |
| 2009/0111616 | A1 | 4/2009 | Creelman | |
| 2012/0214575 | A1 | 8/2012 | Amaitis et al. | |
| 2012/0289339 | A1 | 11/2012 | Wang et al. | |
| 2013/0090157 | A1 | 4/2013 | Tharp | |
| 2013/0157735 | A1* | 6/2013 | Amaitis | G07F 17/323 463/6 |
| 2013/0222597 | A1 | 8/2013 | Brink et al. | |
| 2013/0316818 | A1 | 11/2013 | Earley et al. | |
| 2016/0012663 | A1 | 1/2016 | Chun | |
| 2016/0086441 | A1 | 3/2016 | Cohen et al. | |
| 2016/0125691 | A1 | 5/2016 | Rangarajan et al. | |
| 2016/0133088 | A1 | 5/2016 | Givant | |
| 2016/0267747 | A1 | 9/2016 | Dengler | |
| 2017/0001115 | A1 | 1/2017 | Melinger et al. | |
| 2018/0005492 | A1 | 1/2018 | Hall | |
| 2018/0025586 | A1 | 1/2018 | Lockton | |
| 2018/0165700 | A1 | 6/2018 | Onda et al. | |
| 2019/0070509 | A1 | 3/2019 | Kesack et al. | |
| 2019/0075176 | A1 | 3/2019 | Nguyen et al. | |
| 2019/0197836 | A1 | 6/2019 | Huke | |
| 2019/0262721 | A1 | 8/2019 | MacInnes et al. | |
| 2019/0378374 | A1 | 12/2019 | Sawyer et al. | |
| 2019/0381410 | A1 | 12/2019 | Lo et al. | |
| 2019/0384469 | A1 | 12/2019 | Lo et al. | |
| 2023/0009825 | A1* | 1/2023 | Rosette | G07F 17/3288 |
| 2023/0112232 | A1* | 4/2023 | Huke | G07F 17/3269 463/20 |

FOREIGN PATENT DOCUMENTS

| | | | |
|---|---|---|---|
| CN | 109475777 | A | 3/2019 |
| WO | 2007118300 | A1 | 10/2007 |
| WO | 2019118465 | A2 | 6/2019 |
| WO | 2019168994 | A1 | 9/2019 |

OTHER PUBLICATIONS

Notification of Transmittal of the International Search Report and the Written Opinion of the International Searching Authority, or the Declaration issued on Aug. 25, 2020 in International Application No. PCT/US 20/34241; 9 pages.

International Search Report and Written Opinion issued on Apr. 14, 2022 in corresponding International Patent Application No. PCT/US2021/064057; 7 pages.

Office Action issued on Apr. 12, 2022, in connection with corresponding Chinese Application No. 202080057510.6 (2 pp., including English translation).

Extended European Search Report issued Nov. 25, 2022, in corresponding European Application No. 20/823,662, 8 pages.

Office Action issued on Apr. 15, 2023, in corresponding Chinese Application No. 202080057510.6, 26 pages.

* cited by examiner

300

300

800

Fig. 9
300
AT&T
8:57 PM
70%
Packers - Patriots
All Games
Leaderboard
WALLET
26,830
WINS
+5,210
1
QTR
4TH & 6
DWN
NE 44
YDL
3-7
SCORE
Choose:
PUNT
FIELD GOAL
PLAY
900
37 Plays
19 WINS
18 LOST
902

300

1400

METHOD, SYSTEM, AND COMPUTER PROGRAM PRODUCT FOR INTERACTIVE SPORTS GAME

CROSS-REFERENCE TO RELATED APPLICATIONS

This application is a Continuation of U.S. patent application Ser. No. 17/128,543, filed on Dec. 21, 2020, which claims priority as a continuation in part of application to U.S. patent application Ser. No. 16/441,516, filed on Jun. 14, 2019; U.S. patent application Ser. No. 16/232,277, filed on Dec. 26, 2018; and U.S. Provisional Patent Application Ser. No. 62/609,472, filed on Dec. 22, 2017, the contents of each of which are incorporated by reference in their entirety.

BACKGROUND

Video games are common on mobile devices, such as smartphones. Additionally, the rise of fantasy sports and daily fantasy sports have resulted in people using their smartphones extensively while watching live sporting events. The smartphone (or other internet-connected device) can be utilized to track player and team performance and allow a user to determine if they have won or lost such games.

Additionally, it is customary for people to wager on games and other sporting events. However, due to the complexity in placing wagers outside of fantasy sports, it is often difficult for users to place wagers on certain aspects of a game outside of its outcome or score. Moreover, there does not exist technology which would allow a user to wager on game events and determines wins and losses on these wagers in real time.

SUMMARY

A computer implemented interactive game involving analytics and real time data analysis. The interactive game can allow players to predict and wager on the types of plays that have yet to occur, for example, in a football game. The game may utilize an algorithm that compares situational data in a game to stored data regarding similar situations in past games. The game can then provide a likelihood that a certain type of play can be performed, which may be interpreted as odds of a certain type of play. Users can then utilize this information to predict and wager on the upcoming play. Depending on the results of the play, users may win or lose their wager.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

In exemplary embodiments, and generally referring to the figures, a method, system and computer program may be shown and described. In the exemplary embodiments, a game may be provided whereby users can utilize odds generated by a computer system to predict and wager on the types of plays a sports team may execute, for example in a game of football.

Figure 1:
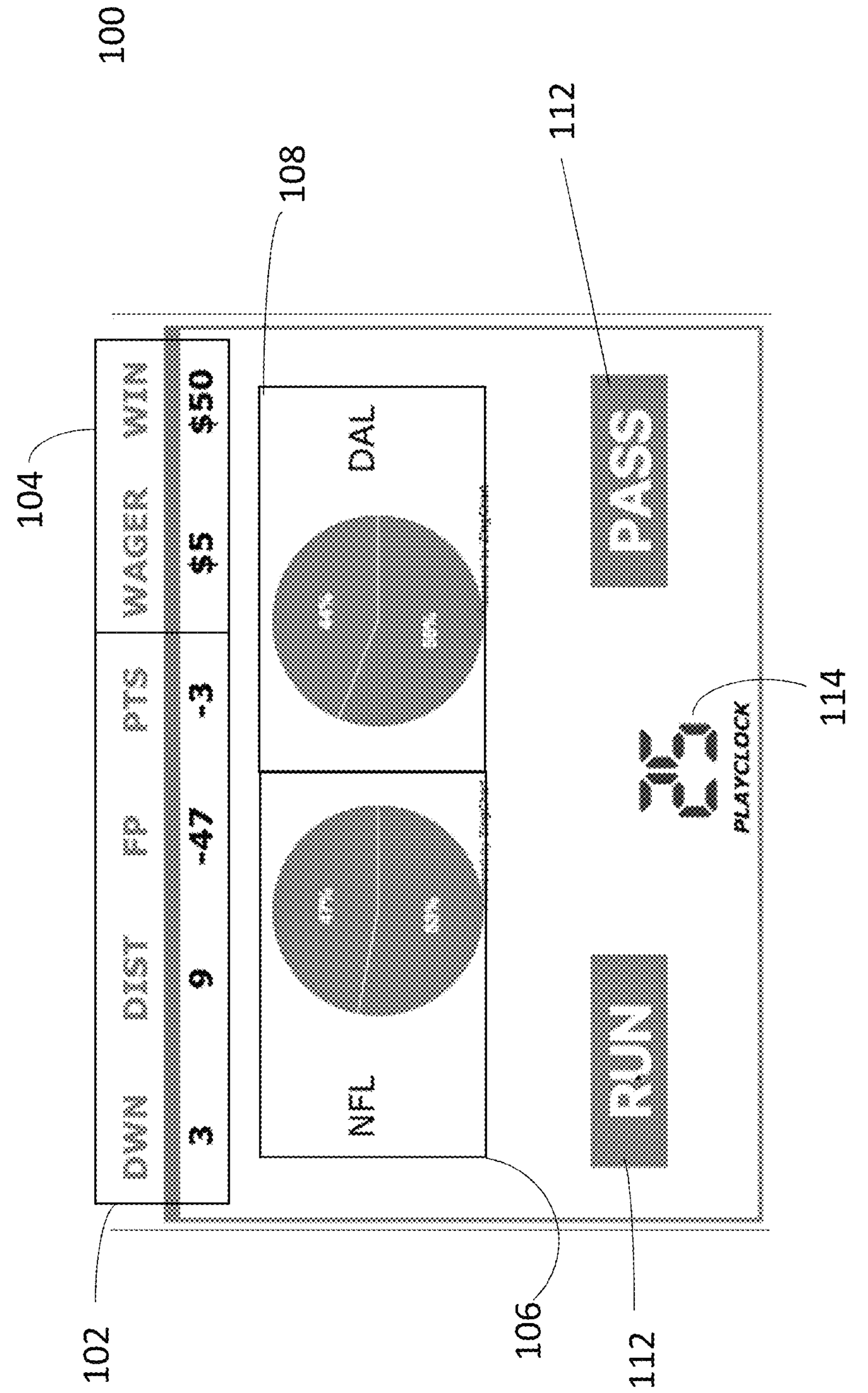
FIG. 1 is an exemplary diagram of an interactive computer game method and system interface.

Referring now to exemplary FIG. 1, an interface 100 may be provided that displays various information and data for a game. Interface 100 may include a number of fields that either provide data or allow for user input. For example, situational data may be provided in situational data field 102. Field 102 can include, for a football game, the current down, the distance needed for a first down, the field position, the current point differential between the teams (i.e. score of the game), and other relevant information, as desired. Account field 104 may provide current wager information and total account information or total winnings from a game, session, previous play, or the like, as desired. Additionally, account field 104 may be interactive, so as to allow a user to change their wager. Statistical fields 106 and 108 may provide data regarding analytics or statistical determinations for the current situation in the game. Field 106 may provide overall statistical information for all teams in a league in that situation. Field 108 may provide statistical data for the team currently in possession of the ball. It may be appreciated that the data used to provide the analytics in fields 106 and 108 may be data from a current season, data from a predefined number of games, data from a number of seasons, or any other time period as desired. Further, the data and associated time periods for the information in fields 106 and 108 may be adjusted or toggled by a user, for example to reflect the time since a new head coach on a team, reflect the time since a star player went on injured reserve, reflect the time since a rule change in the league, or the like.

Still referring to exemplary FIG. 1, play clock 114 may be a clock that provides a visual indication to the amount of time where a user may need to take an action. Alternatively, play clock 114 may be synchronized to a play clock in an ongoing game. Play options 112 may be utilized for accepting user predictions for the coming play. Although RUN and PASS are shown in this exemplary embodiment, it is envisioned that other options (for example "PUNT" or "PENALTY") could be utilized in football. Additionally, and alternatively, the options may be customized for other sports. For example, interface 100 could be tailored to basketball with "THREE POINTER" and "TWO POINTER" displayed as play options 112; interface 100 could be tailored to baseball with "HIT" or "OUT" displayed as play options 112, and so forth. In still other exemplary embodiments, the game may also be tailored to actions associated with individual players. For example, if using the game during a basketball game, it may allow for wagering on which player on the team will take a shot, or the like.

In an exemplary embodiment, any number of players may be logged into the game and may view interface 100. Players of the game may compete against each other for points or may place wagers through any form of money depositing and wagering system. Then, based on information shown in field 102, situational data may be interpreted and analyzed by a remotely located server (not pictured). The server may utilize historical data for any number of teams (for example all teams in a league) and/or for the specific team with possession of the ball. The analytics performed by the server may then be outputted in fields 106 (entire league) and 108 (specific team). Historical data may include, for example, team play data for the current season, team play data for previous years, such as 5 years of historical data, league data for the current season, league data for previous years, and so forth. Further, the game may weight different historical data more heavily or disregard very limited historical data, as further discussed below. Additionally, it may be appreciated that the amount of historical information utilized may vary depending on circumstances or availability. For example, historical data related to an entire league may only be available for a certain number of years or may be determined to only be relevant for a certain number of years, for example during a number of seasons in a football league where passing was much more prevalent than running. Additionally, there may be a lack of historical or historically relevant data for a team, a player, a coach, a division, or a league. In such situations, for example when there is a lack of available information about a team given a certain set of situational data in a live game, then division or league-wide historical data may be utilized for odds generation, wager making, or other analysis. Further, historical data may be related to a current game, current season, current coach, current player or players, or the like or any combination thereof. Such determinations may be performed, for example, using one or more thresholds and/or artificial intelligence. Additionally, it should be appreciated that there may be multiple databases of historical information utilized for odds generation, wager making, or other analysis. For example a first database of team historical data may be utilized for generating regular wagers in a play by play wagering game. However, a second database associated with an individual player, coach, or any other team or leagues, as desired, may be utilized to generate prop bets or alternative bets, either based on an analysis of the historical data or based on one or more triggering events in a game being played.

The user may then select a wager from field 104 and choose a desired play option 112, for example predicting and wagering that the next play will be a pass or a run. As the action takes place on the field, the remotely located server can either make a determination that the play is a pass or run through the utilization of various sensors (as described below) or data may be input to the server indicating that the play was a pass or run. Then, once the play occurs, the interface 100 may be updated to show that a pass or run occurred, for example by highlighting or otherwise emphasizing filed 106 or 108, and the winnings amount in field 104 may be updated to show that a user won or lost on their wager. The interface 100 may then update or reset for the next play.

Figure 2:
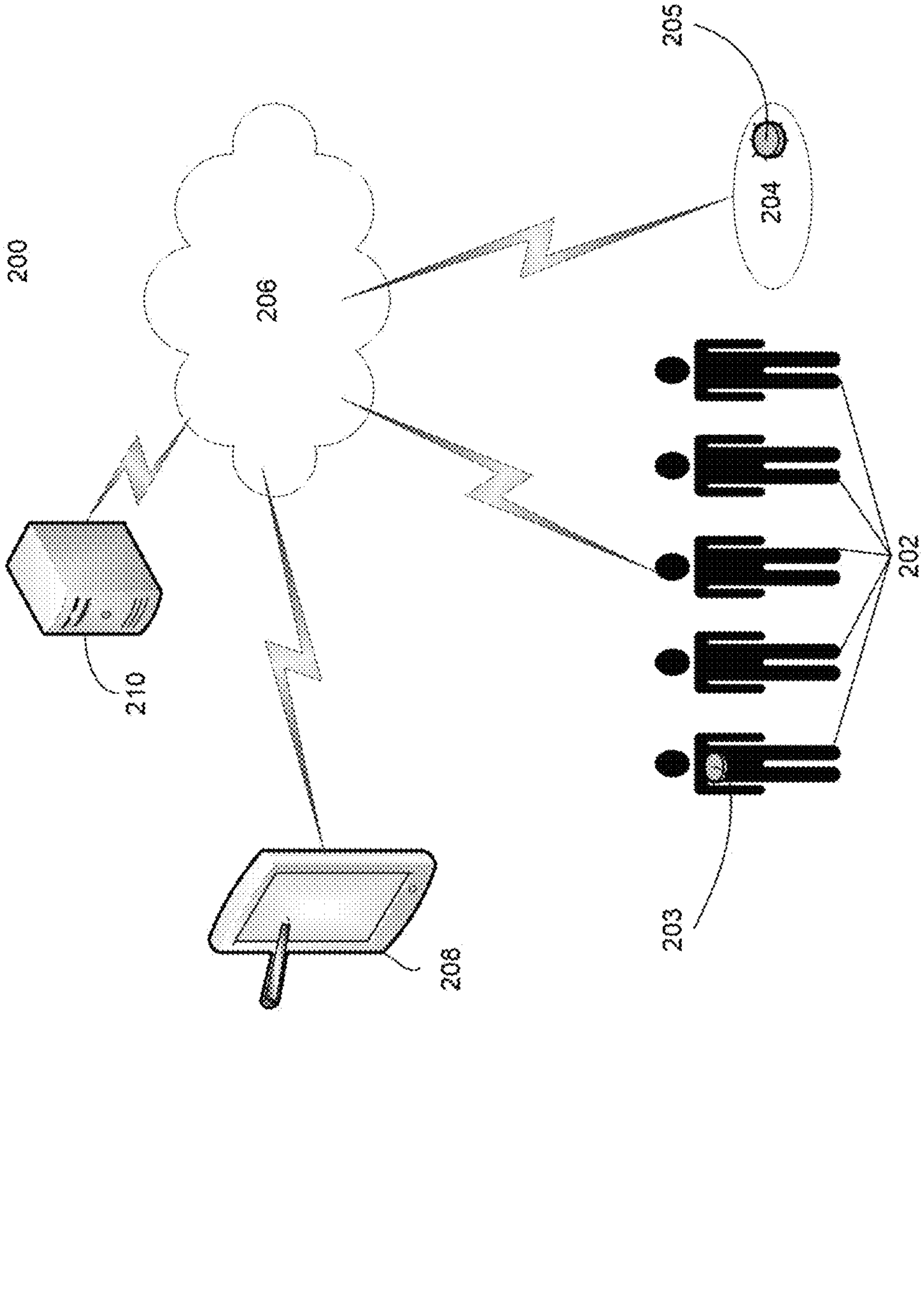
FIG. 2 is an exemplary diagram of an interactive computer game showing data transfers.

Referring now to exemplary FIG. 2, another embodiment of a tool for analyzing situations and scenarios and outputting plays with the highest probability of success may be shown. In this exemplary embodiment, system 200 may be similar to system 100 described above. However, here system 200 may be integrated with the game be played to further allow for system 100 to be utilized in real time during a game, such as a football game. The system may include any number of players 202. Each player 202 may have a tracking device 203, such as an RFID tag, GPS chip, or other such device embedded on their uniform. Additionally, ball 204 may have a similar tracking device 205 embedded therein. These devices may be used to track player and ball movement during the course of a play. As a result, the location of the players, the type of play (for example pass or run), their movement and speed of movement, and the progress of the play (such as gaining a certain number of yards or scoring), may be tracked during each play. It may be appreciated that a field on which the game is being played may also include embedded sensors for tracking the movement of players 202 and/or the ball 204. Alternatively, sensors otherwise positioned proximate or near the field of play, remotely located scanners, satellites, or the like can also be used to track the movement of players 202 and the ball 204. Further, it may be appreciated that the sensors or tracking devices may act as a prompt or cue for server 210 to take action, such as transmitting data to players of an interactive sports game or determining the results of wagers. For example, if one or more sensors in a game stop moving, it may be determined that a play has ended or there is some other stop in the action, which may prompt server 210 to perform an action.

Still referring to exemplary FIG. 2, once a play is underway, the movement of the players 202 and ball 204 may be tracked. This information, or data otherwise obtained regarding a play or action in a game, may be uploaded to cloud 206, which can include historical information housed in a database, and an indication of what type of play, for example pass or run, may be immediately determined. In this embodiment, cloud 206 may be communicatively coupled to server 210 which may perform real time analysis on the type of play and the result of the play based on the movement of players 202 and ball 204, utilizing information gathered from sensors 203 and 205. Server 210 (or cloud 206) may also be synchronized with game situational data, such as the time of the game, the score, location on the field, weather conditions, and the like which may affect the choice of play utilized. For example, in other exemplary embodiments, server 210 may not receive data gathered from sensors and may, instead, receive data from an alternative data feed, such as Sports Radar. This data may be provided substantially immediately following the completion of any play and the data from this feed may be compared with a variety of team data and league data based on a variety of elements, including down, possession, score, time, team, and so forth, as described in various exemplary embodiments herein.

Upon the completion of a play, the data is sent to cloud 206 for storage and server 210 performs the analysis of the play, as described previously. Further, server 210 will utilize the result of the play, the situational data, and other analysis and data described herein to transmit data to a computing device 208, such as a smart phone or other computing device capable of displaying interface 100 from exemplary FIG. 1. In this exemplary embodiment, the movement of the players 202 and ball 204 may be tracked and updated in real time so that the information, after being transmitted to cloud 206, is interpreted by server 210. Server 210 can then calculate the results of any wagers made on device 208 (or multiple devices 208, as desired or appropriate if a variety of people are playing the game on their individual smartphones, for example). Account information in field 204 may then be updated based on results from the previous play's wager and the action taken (e.g. "RUN" or "PASS") during the previous play. Additionally, interface 100 may then be updated on device 208 to reflect the likelihood that the next play is a "RUN" or "PASS" in fields 106, 108. The play can then be continued by a user of device 208.

It may further be appreciated that any number of options may be presented to players of the game shown in interface 100. For example, in addition to "RUN" and "PASS", options may exist for other plays, such as a penalty, punt, field goal, etc. Additionally, as noted above, the game can be implemented with respect to different sports, as desired, and include any number of options for players of the game on interface 100 to predict or wager on.

Additionally, in some exemplary embodiments, the start and completion of a play may be automatically signaled or detected by the system 200. For example, if motion of the ball 204 stops, the server 210 may effectively detect the end of a play. This can be used as a trigger mechanism to reset play clock 114, allow time for performing analytics to determine the likelihood of the next play being a pass or run based on the historical data in server 210, and automatically prompt users of interface 100 to make their next wager and play selection.

Figure 15:
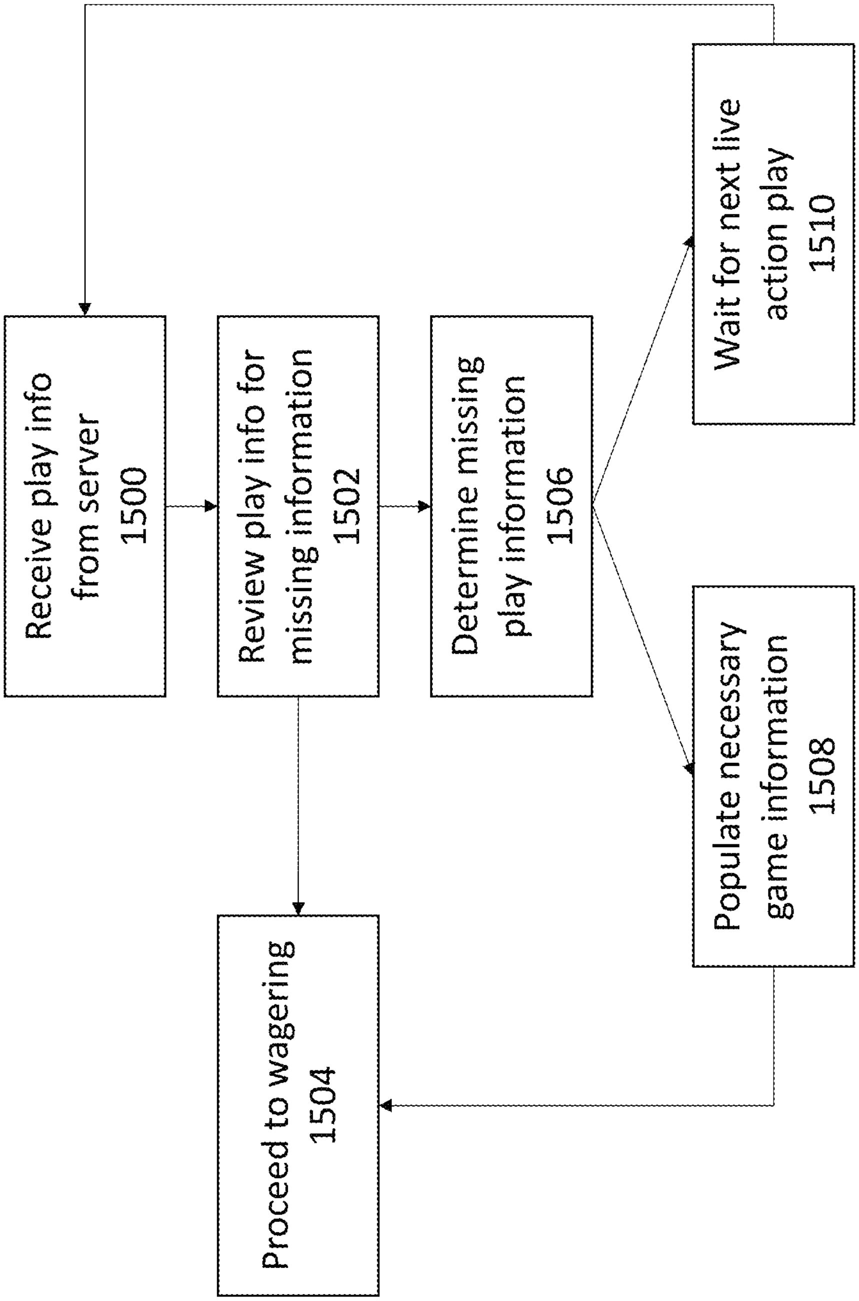
FIG. 15 is an exemplary flowchart showing an algorithm used in an interactive game.

In another exemplary embodiment, and referring to exemplary FIG. 15, in 1500 a server may receive play result information, such as latest play information, score, time, and other game play activity in real time. For example, in a football game, data regarding plays, such as the involved players, type of play, result of play, down and distance information, and so forth. In one exemplary embodiment, this information may be provided by Sports Radar and transmitted to the server.

Next, in 1502, the play information may be evaluated for missing information. In some exemplary embodiments, the play result information may be complete such that all data used for wagering may be provided. In those situations, game play of the interactive sports game may continue and proceed to wagering 1504. In other exemplary embodiments, incomplete play result data may be provided to the server. In such situations where incomplete play result information is provided 1506, the system may recognize missing data and take appropriate action to complete the data 1508 in order to ensure continuity of game play. For example, if play result data is missing score information, score data may be inserted into play result data using an alternative data source, artificial intelligence (AI), or manual input.

In the above embodiment, in the event that there is no missing data, gameplay and associated wagering may proceed in 1504. In the event that it is determined that there is missing data, gameplay may be temporarily delayed, and a determination of what data is missing may be performed. Upon determination of the missing data 1506, that data may be inserted in 1508 through data obtained from an alternate feed, manually inserted, or inserted through use of an algorithm that determines what the missing is or should be. Gameplay may then continue per the typical course of action in 1504. Alternatively, if the missing information is not able to be populated because it is not available or if it only becomes known or available following the expiration of a predetermined amount of time or additional game action in the live game is about to take place, then the software may determine that gameplay can only resume following the next play in the live action football game 1510. Further, in some situations, it is understood that a data feed could have missing data or may be interrupted. For example, following a play in a football game, the down, yardage and time may be received, but the score may not be received due to a data transmission error, interruption, or some other problem with the data. In such a situation, the server 210 (or some other computing or data transmission device) may interpret that there is missing data, for example using artificial intelligence or a data comparison. The server 210 (or other device) may then automatically prompt another source or sources for the missing data or a complete set of the desired data. In other embodiments, it is understood that when there is incomplete data or if the received and processed data is somehow inaccurate, a notification can be provided to users of a wagering game, wagers may be voided, wagers/points may be automatically paid out to some or all users, or wagers/points may be automatically updated, voided, or paid out at a later time when it is determined that the data was inaccurate and/or incomplete.

In still other embodiments, data received from any source, such as sensors associated with players and/or a ball, from data feeds, or from any other sources, may be processed and made uniform so as to be interpreted and utilized in a wagering game. Further, understanding that delays resulting from the transmission of data and the broadcast of a game related to the data may exist, any code running and executed on a server and/or software application may be optimized so as to process and provide data and execute commands or instructions. In an embodiment, a time from the ending of a play (such as in a football game) until the data is received, processed, and outputted on a wagering game may be less than one second.

For example, if a play in a football game takes place where the quarterback throws to a wide receiver, 10 yards are gained, and the down is not provided, the system may determine that down information is missing. The system may then take action to resolve the situation by retrieving down information from another source and then proceed with gameplay. Alternatively, the down information could be manually entered and then gameplay can resume. In still other exemplary embodiments, if the information cannot be retrieved within a predetermined time, the system can suspend gameplay until the following when play when all information is provided or otherwise made available. Gameplay may then resume as desired.

In another exemplary embodiment, wagering information may be provided to players of the game at a predetermined time. For example, after play information is provided to the server, the server may then compare play information with historical data. Historical data may be a combination of historical team actions based on the provided play information and historical league actions based on the provided game information. For example, if play information indicates that it is third down, 10 yards to go for a first down, the offense is on their own 40 yard line, the score is tied, and there are three minutes left in the quarter, the server may interpolate this data against historical team and league actions. The server may determine that there is an 85% percent chance of a pass play. Odds may then be calculated and displayed to players of the game, who are then prompted to make a wager. It may be appreciated that the odds may be weighted based on available team historical data. However, absent sufficient team historical data, the odds may be weighted more heavily or completely based on league historical data. Further, in other embodiments, artificial intelligence may be utilized to show wagers based on the current situational data in the game and historical information. In other example, certain events in a game may trigger providing of certain wagers. For example, timing cues or triggers may be utilized. One example of timing cues being used to trigger a wager would be when an offensive team has possession inside of an opponent's 30 yard line, there are fewer than 10 seconds left in the half and there is a dead ball or end of a play, then it may be determined that wagering options related to a field goal attempt should be provided.

In a further exemplary embodiment, it may be appreciated that odds may be weighted based on feedback from current user data or trends. For example, if a large number of users wager on the same outcome, the odds in favor of that outcome may increase as more users wager on that outcome. Current trends may indicate an event which the server has not accounted for and may provide more accurate odds. For example, when calculating the type or outcome of the next play the server may be unable to interpret data that users may clearly understand, such as a player performing poorly due to emotions or other extraneous factors. There may be additional factors outside of historical data that the server is incapable of interpreting, so user data on current betting trends may be utilized to provide the server with additional information to generate more accurate odds. Further, odds may be weighed accordingly to incentivize users to watch a specific team, game, or channel which may be selected based on incentives from the team, league, or channel that broadcasts the game.

Further, an individual user's betting history may provide data to be used in calculating odds. For example, the server may provide individualized odds to account for a user that has previously won or lost multiple wagers. Individualized odds may create a more balanced and desirable level of play and may re-incentivize players who have become disincentivized due to multiple losses. Odds may further be weighted based on a user's betting preferences, such as their preferred team or sport. For example, odds may be more favorable to the user if the user would like to place a wager on team, sport, or player for the first time. Providing such an incentive for a user to watch a new or additional team, game, or sport may increase future revenue by expanding a user's options to potentially place additional wagers.

A further exemplary embodiment may incorporate biometric data regarding a player in determining the odds. For example, the server may take into account information such as heart rate, height, weight, dominant hand/leg, or speed of the offensive player(s) and/or of the defender(s) in calculating the odds of a successful play, game, or outcome. Such information may be obtained from one or more monitors or sensors worn by a player or players. Further, such information may be weighted or otherwise utilized to affect or determine odds.

Other physical changes in the location may also affect the odds. For example, a change in weather or wind speed may affect the odds of a game played outdoors. Further, weather changes during a game, such as snow or rain starting, may be utilized to further calculate or change odds, or may otherwise be integrated into the historical data that is used to set odds. A team originating from a warmer climate may have lower odds when traveling to a colder climate. If a game is played in a dome, weather or wind speed calculations may not be added. A change in time or time zone may also be considered when calculating the odds.

Figure 3:
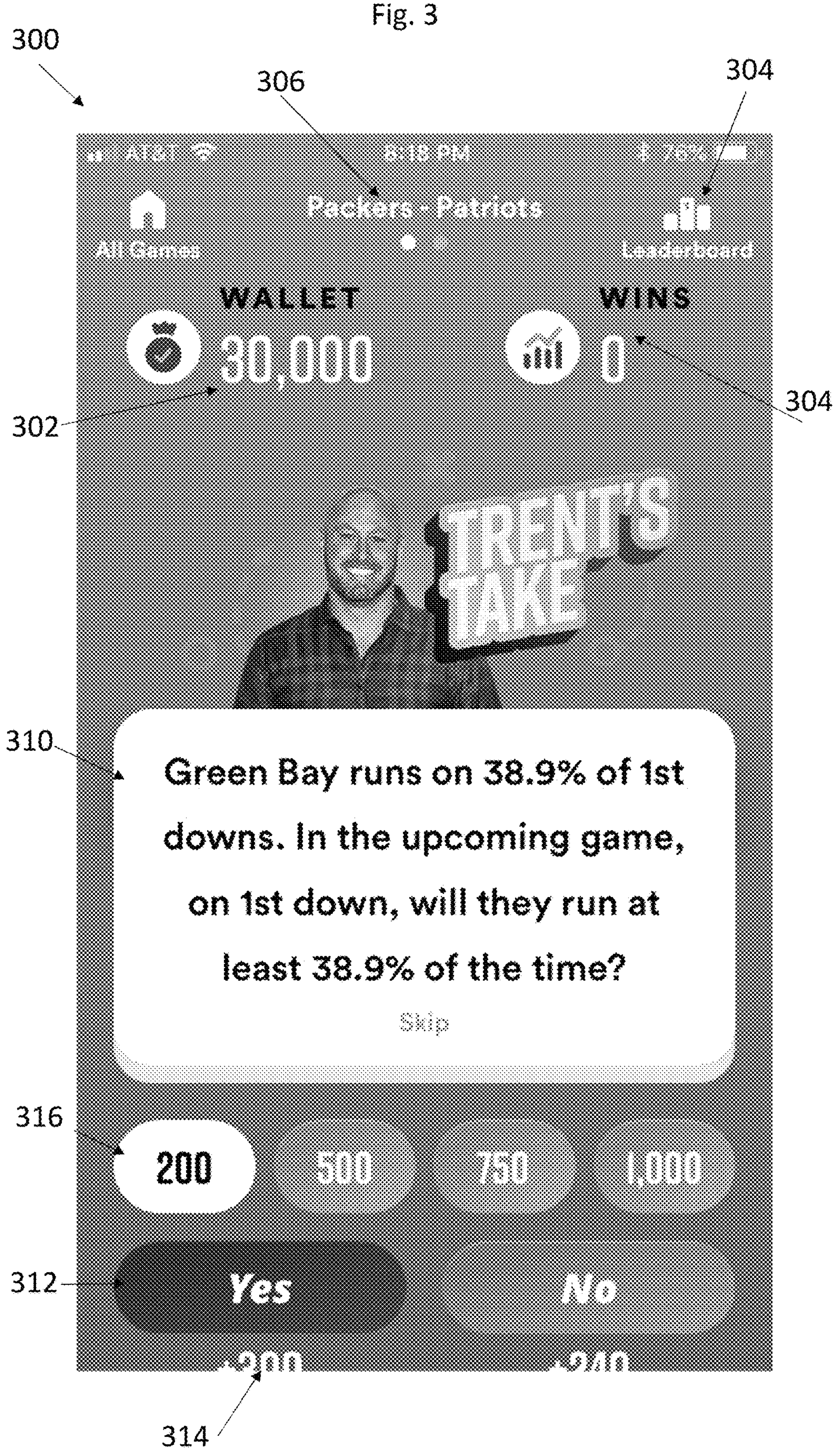
FIG. 3 is an exemplary diagram of an interactive computer game interface and game play occurring before the start of a game.

Referring now to exemplary FIG. 3, game interface 300 and related information may be shown for an interactive sports game. Interface 300 may include wallet 302, showing an amount of points or money that a player of the game can use for wagering, wins field 304, showing historical information related to previous wins of the player playing the interactive sports game. Field 306 may provide live game information. This information can include the two teams who are playing and upon which the interactive sports game is related to, so that players of the interactive sports game can watch the game live on television or in person. Additionally, this information in field 306 can be associated with the various databases to determine historical play information and determine betting odds for a play. Field 308 may provide leaderboard information, which may show rankings of the players of the interactive sports game upon selection by a player.

Wagering prompt 310 may be provided based on one or more predetermined cues. Wagering prompt may be associated with one or more predetermined actions that cause it to appear, such as the start of a game, the start of a drive, the end of a quarter, half, or other time period, and the like. In the example of FIG. 3, wagering prompt 310 is provided before the start of a game and prompts players to wager based on historical information contained in the prompt 310. The historical information may be stored in one or more databases associated with a server or cloud, as described previously. Based on an interpretation of the historical data, wager options 312 may be displayed, odds 314 may be displayed, and wager values 316 may be provided. Thus, in the exemplary embodiment of FIG. 3, if a player of the interactive sports game review the wagering prompt 310 and believes that the team will not run the ball 38.9% of the time, they could select "No" from wager options 312, then select a wager value 316. Then, at the end of the game, the server will automatically calculate the percentage of plays that were runs and award points or money based on the correct wagers. It should be appreciated that successful wagers will pay out based on the associated odds. Thus, if a player risks 200 points from wager value 316 that there would be fewer than 38.9% running plays, that wager would pay out 480 points based on the +240 odds.

Figure 4:
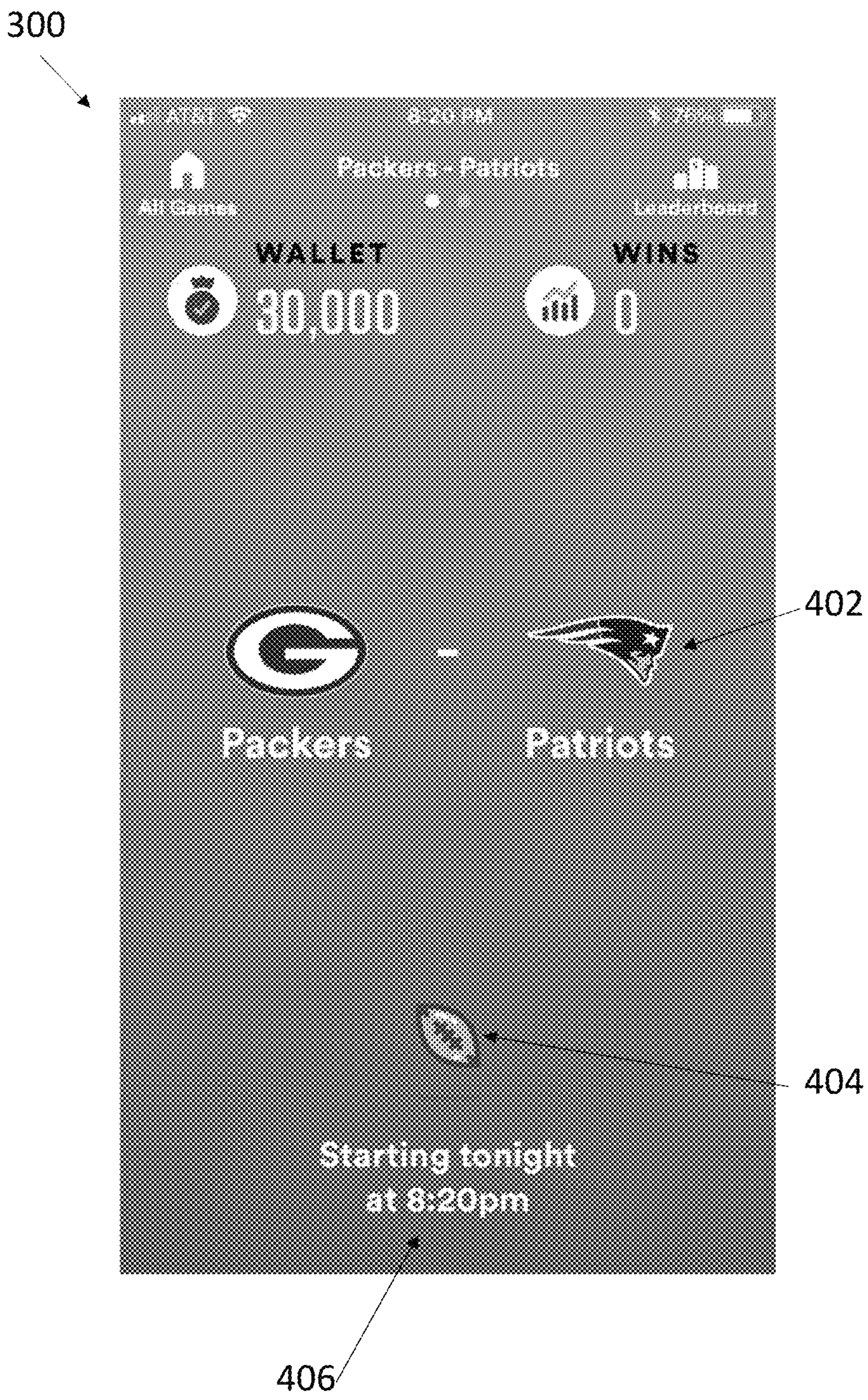
FIG. 4 is an exemplary diagram of an interactive computer game interface showing game scheduling information.

Now referring to exemplary FIG. 4, another embodiment may be provided. Here, an introductory screen may be shown on game interface 300. Included can be team indicia 402 to show who the game upon which the interactive sports game will be based, sport indicator 404 to indicate the type of sport (showing football in this embodiment), and a start time for the game, at which point the interactive sports game may go live.

Figure 5:
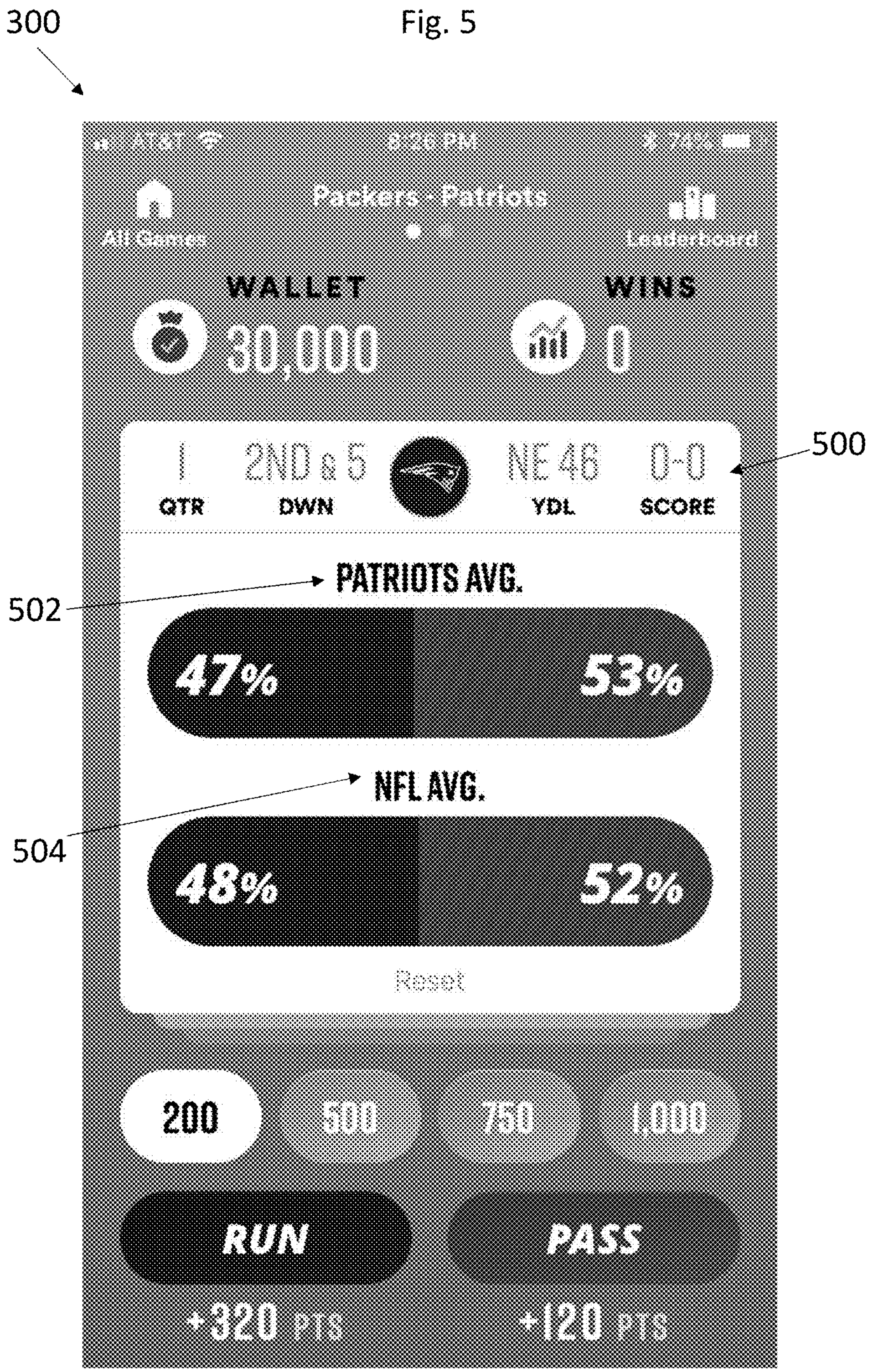
FIG. 5 is an exemplary diagram of an interactive computer game interface and game play based on live action game events.

In exemplary FIG. 5, an embodiment of game play of the interactive sports game may be provided. Here, wagering prompt 310 may provide a variety of information on interface 300. The information may include situational information 500, which can include quarter, down, offensive team, yard line, and score. It may be appreciated that additional or alternative situational information 500 may be provided depending on the game or sport which is being used for the basis of the interactive sports game. Further, wagering prompt 310 can provide historical data 502 for the offensive team based on the situational information 500, as well as historical data 504 for all teams in the league based on the situational information 500. The server can then interpret this data to provide wagering odds 314. Wager options 312 may then be provided according to the analysis of the historical data 502, 504 as well. The player of the interactive sports game may then make desired wagers, as described above.

Figure 6A:
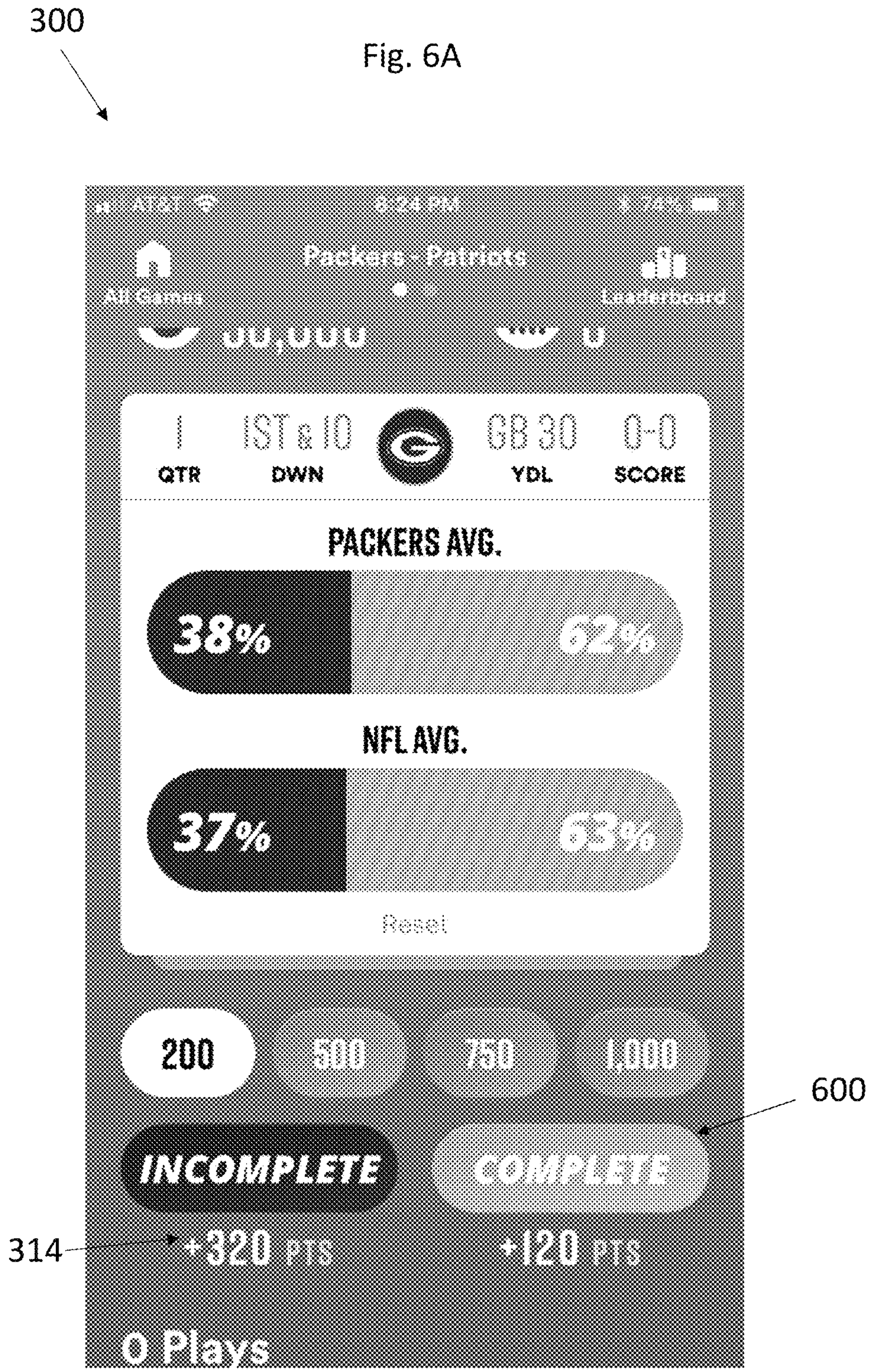
FIG. 6A is an exemplary diagram of an interactive computer game interface providing further prediction and/or wagering options.

Referring now to exemplary FIG. 6A, after a wager is placed in the exemplary embodiment shown in FIG. 5, further wager options may be provided. In this embodiment, the player of the interactive sports game would have previously wagered that the team on offense was going to pass. Upon that selection, the server can provide further wager options 600, which can include "incomplete" or "complete". Odds 314 for the complete or incomplete pass may also be provided and may be determined by the server based on any combination of historical data, situational data, and, in some exemplary embodiments, player data. For example, if a starting quarterback is injured and a backup quarterback is playing, who is not as good statistically as the starting quarterback, the odds may be adjusted accordingly. As in the above exemplary embodiments, the player of the interactive sports game may then make an appropriate wager.

Figure 6B:
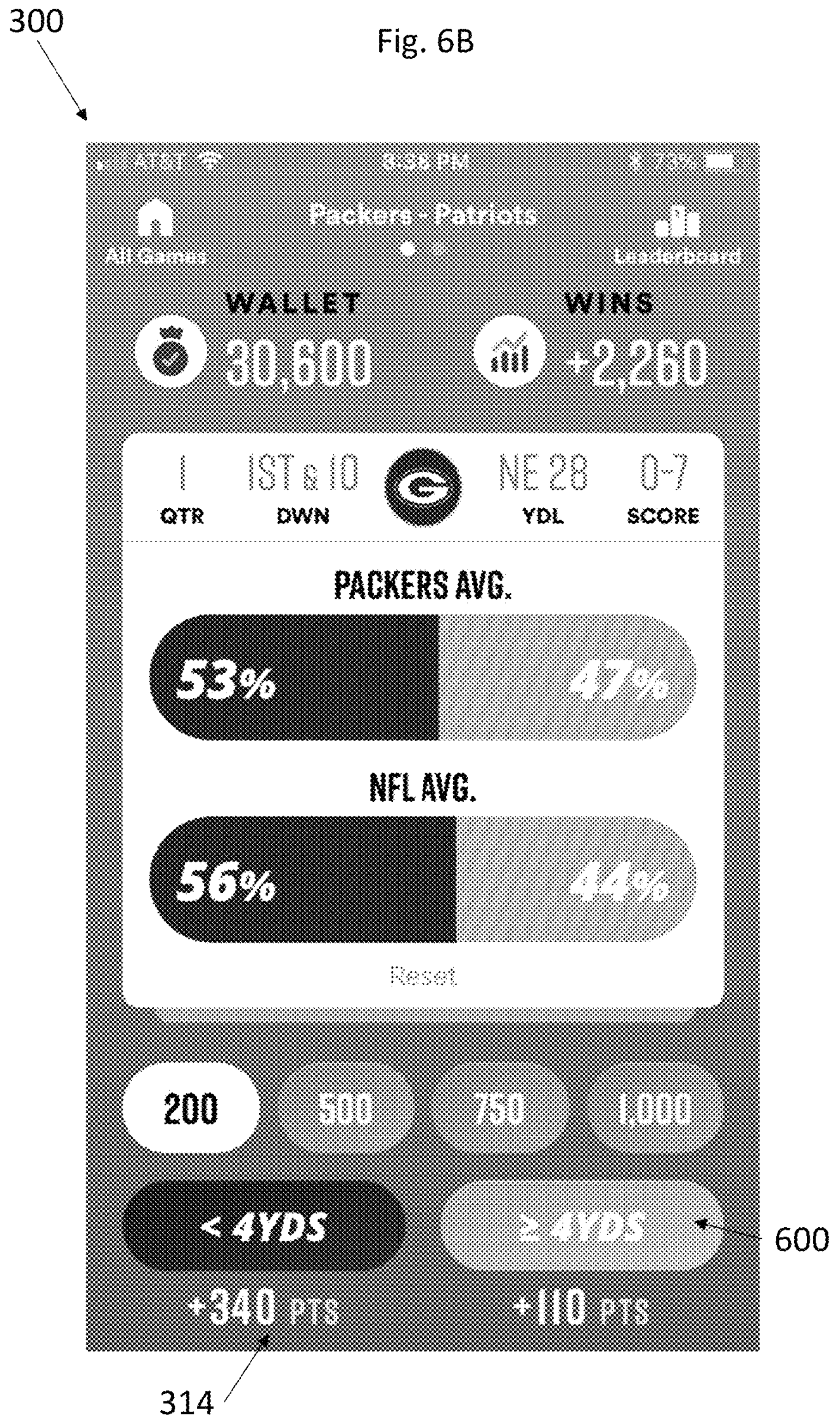
FIG. 6B is an exemplary diagram of an interactive computer game interface providing further prediction and/or wagering options.
Figure 6C:
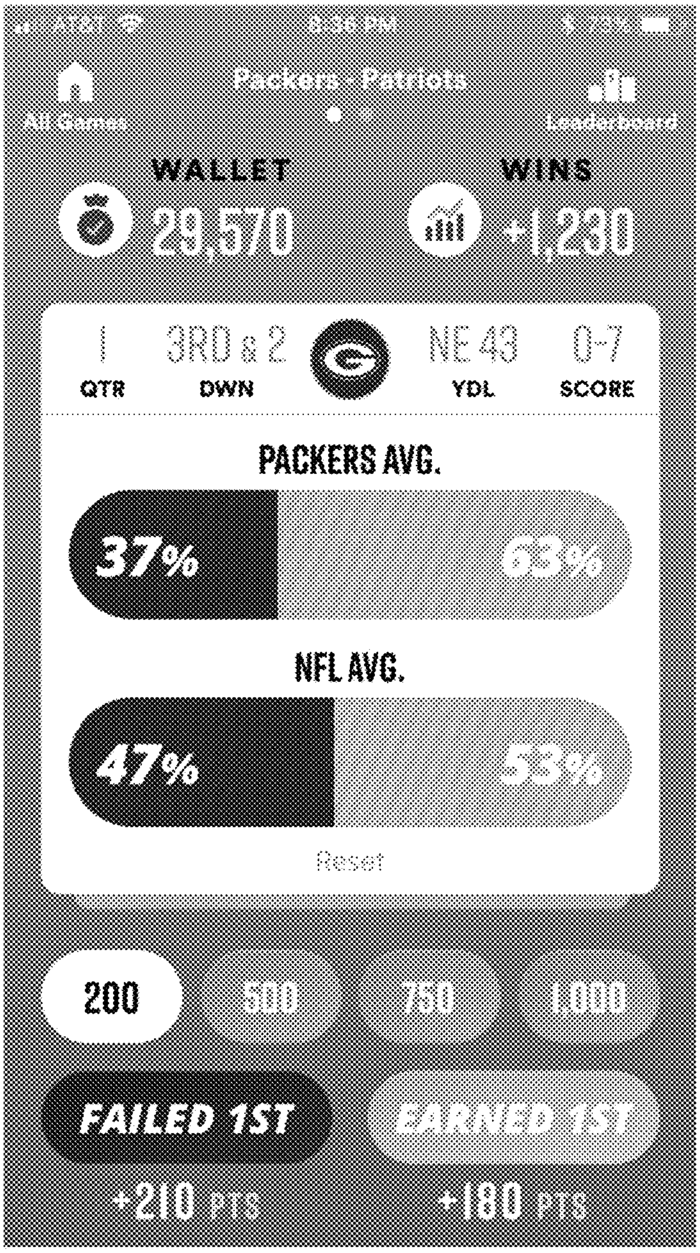
FIG. 6C is an exemplary diagram of an interactive computer game interface providing further prediction and/or wagering options.

In another exemplary embodiment, if the player of the interactive sports game had previously selected "Run" as the wager option, interface 300 of exemplary FIG. 6B could be provided. Here, further wager options can relate to the total yardage of the run play. As another alternative exemplary embodiment, as shown in FIG. 6C, wagers may also be placed on situational conditions, such as whether or not a team will get a first down on the following play. As with other scenarios, the server may provide a prompt for such a wager depending on an analysis of game conditions. Additionally, as in other exemplary embodiments, odds may be calculated by the server based on a combination of team and league historical data. Further, as shown in other exemplary embodiments below, the server can select other, less typical, plays for wagering, depending on an analysis of game and historical data.

Figure 7:
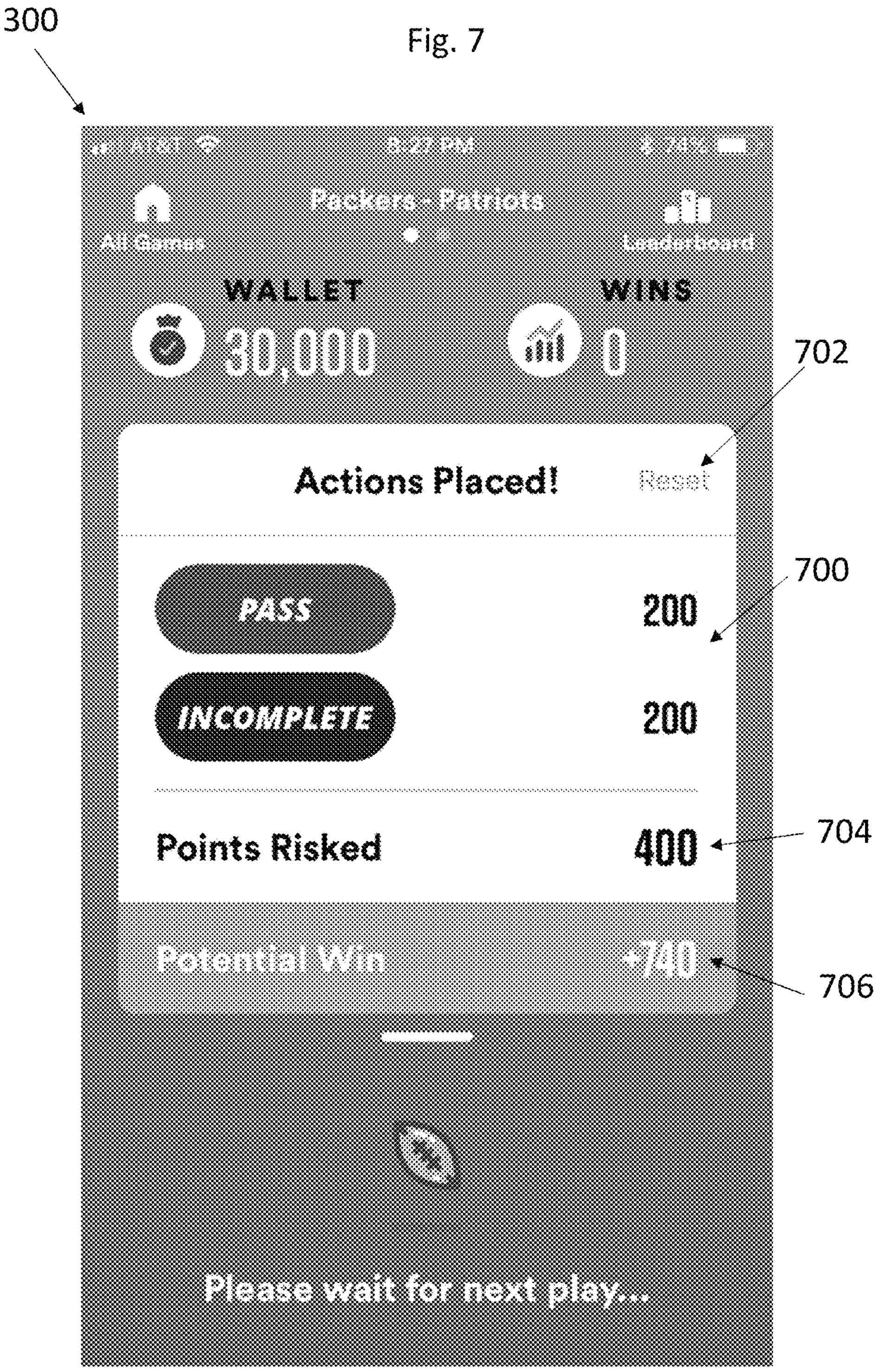
FIG. 7 is an exemplary diagram of an interactive computer game interface and game play providing a summary of a user's wagers and activity.
Figure 8:
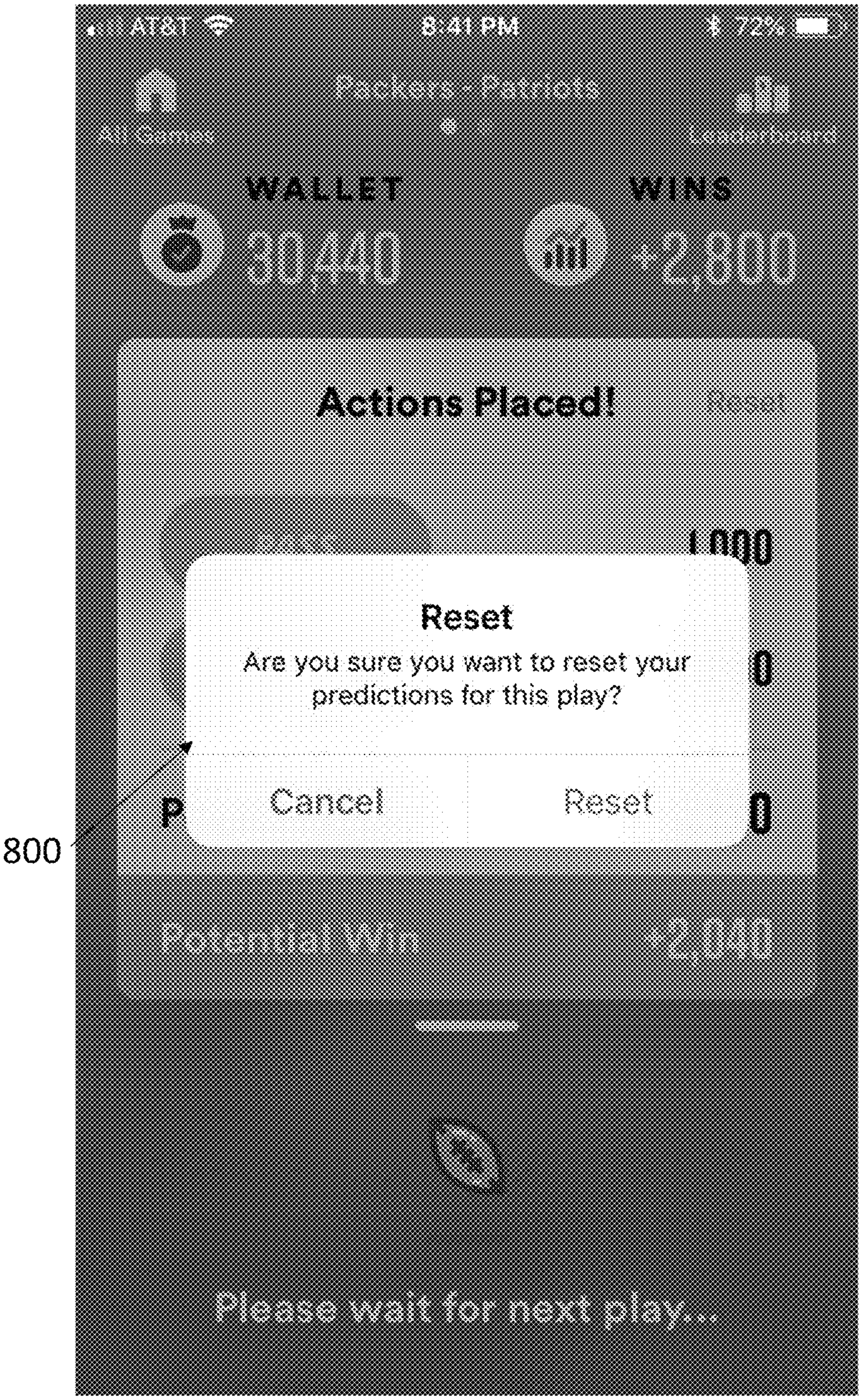
FIG. 8 is an exemplary diagram of an interactive computer game interface and game play showing a reset option.

Exemplary FIG. 7 provides 300 with a summary of the wagers placed by the player of the interactive sports game. Here the player would have wagered on the play being a pass as a first wager, and then wagered on the pass being complete for the second wager, as shown in summary 700. If the player reviews the summary and is not satisfied or otherwise wants to change wagers, the player can select reset 702. Selecting reset can provide a pop up window 800 with options to confirm a wager reset, as shown in exemplary FIG. 8. Selecting the "Reset" option here will clear the wagers and take the user back to a previous screen, such as that shown in exemplary FIG. 5. Selecting cancel will take the user back to the exemplary embodiment shown in FIG. 7.

Further, and referring back to exemplary FIG. 7, summary 700 can provide an indication of total points wagered 704 as well as the potential win amount 740. These figures are determined by the server and the potential win amount 310 is calculated automatically by executing calculations based on the amounts wagered and the odds for each of those wagers.

Figure 9:
FIG. 9 is an exemplary diagram of an interactive computer game interface and game play showing alternative play prediction and wagering options.
Figure 10:
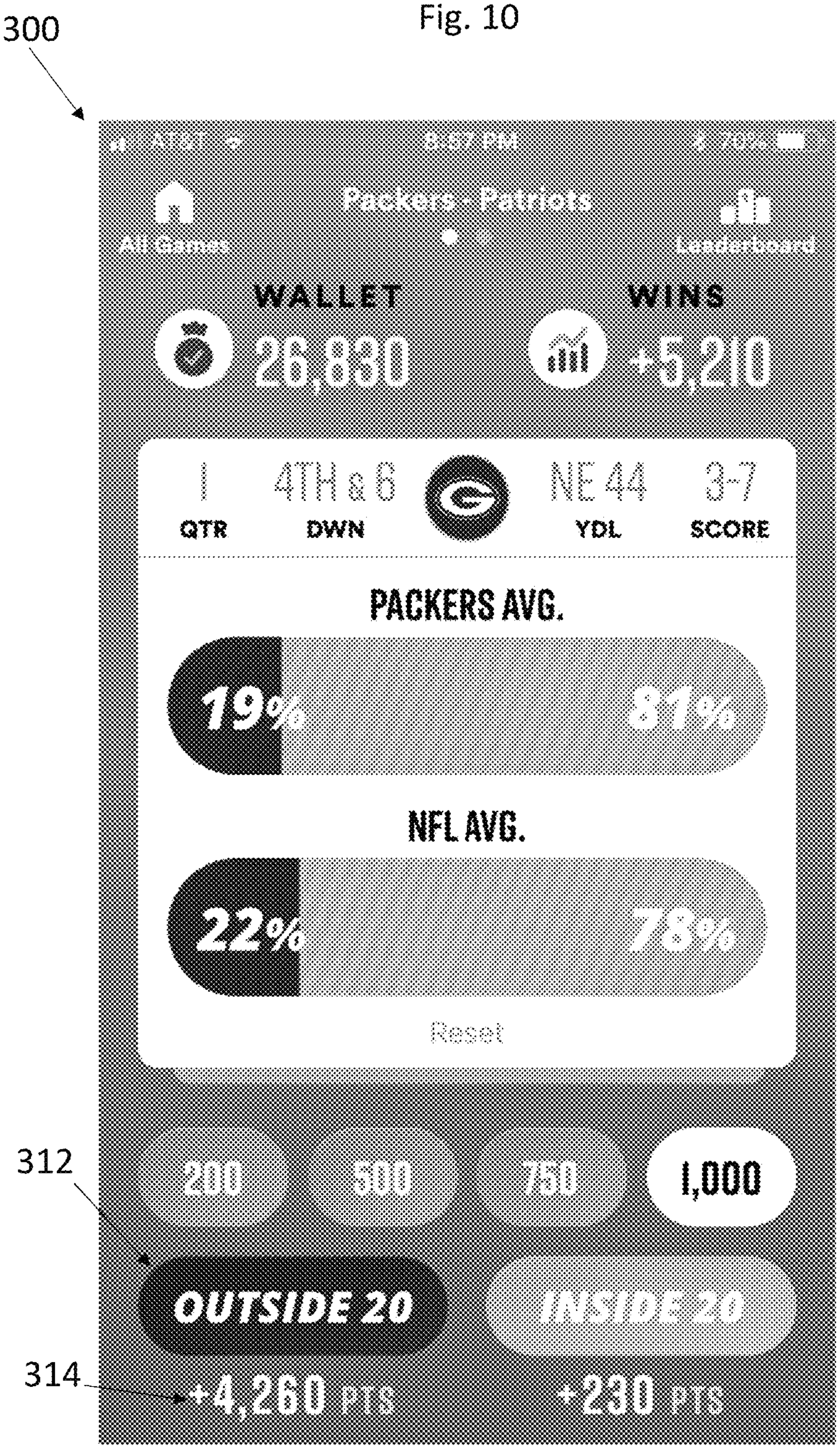
FIG. 10 is an exemplary diagram of an interactive computer game interface and game play showing alternative play prediction and wagering options.

In another exemplary embodiment, the server may determine, based on historical data 500, that a more unusual or rare play is likely to happen. For example, the server can interpret time, down, yardage, yard line, score and offense historical data to determine that a special teams play, or the equivalent in other sports, may be likely. Thus, the player of the interactive sports game can be presented with wager options 900, as shown in exemplary FIG. 9. Following such determinations by the server, additional options may be provided, such as "Punt", "Field Goal", and "Play". Further, as shown in exemplary FIG. 9, other game play information, such as the number of plays wagered on and the number of correct wagers 902 may be shown. Upon selection of one of these options, the player may then proceed to another screen, such as that shown in exemplary FIG. 5 and, for each option, one or more types of plays and outcomes may be selected for wagering. For example, in FIG. 10, a player had selected "Punt" on the previous screen and is now presented with odds 314 and wager options 312 for where the punt would be downed or where the receiving team would take possession. Again, these odds 314 are calculated by the server in real time based on the indicators described above and displayed on interface 300.

Figure 11:
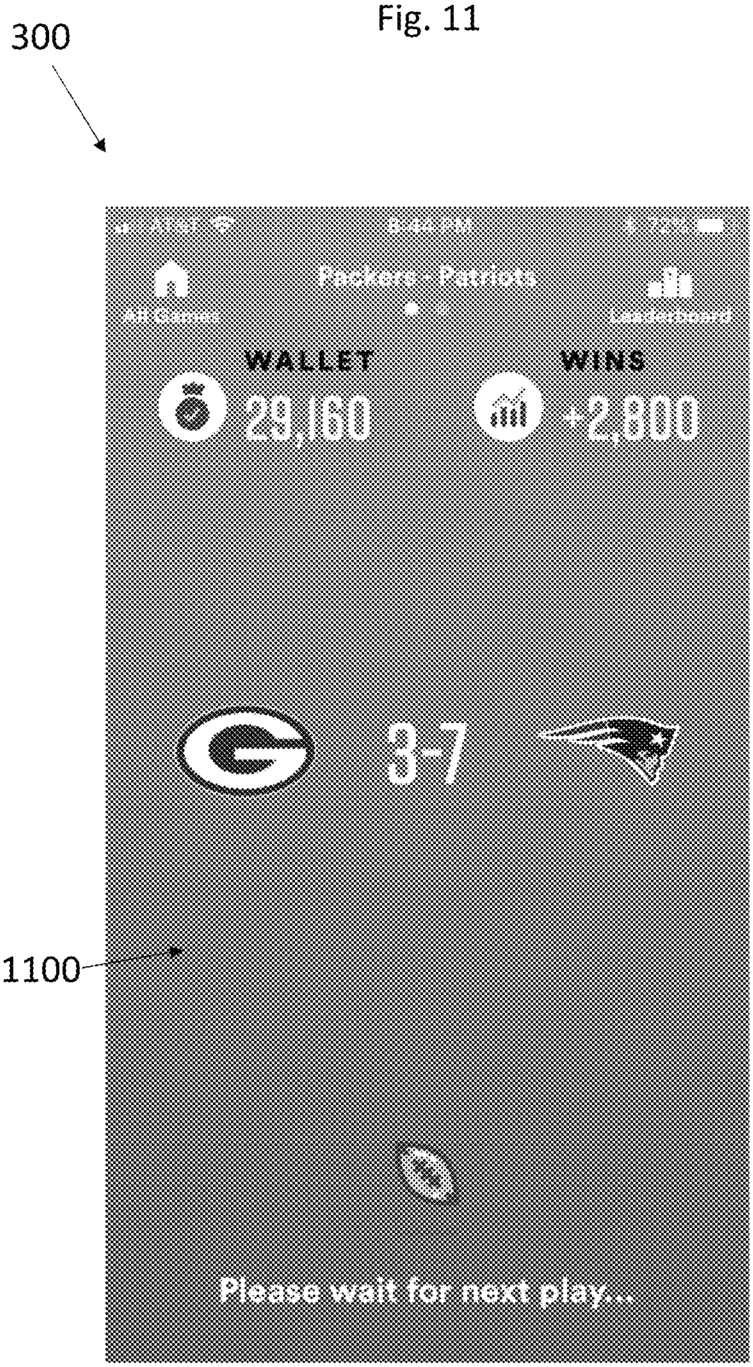
FIG. 11 is an exemplary diagram of an interactive computer game interface and game play placeholder screen.
Figure 12:
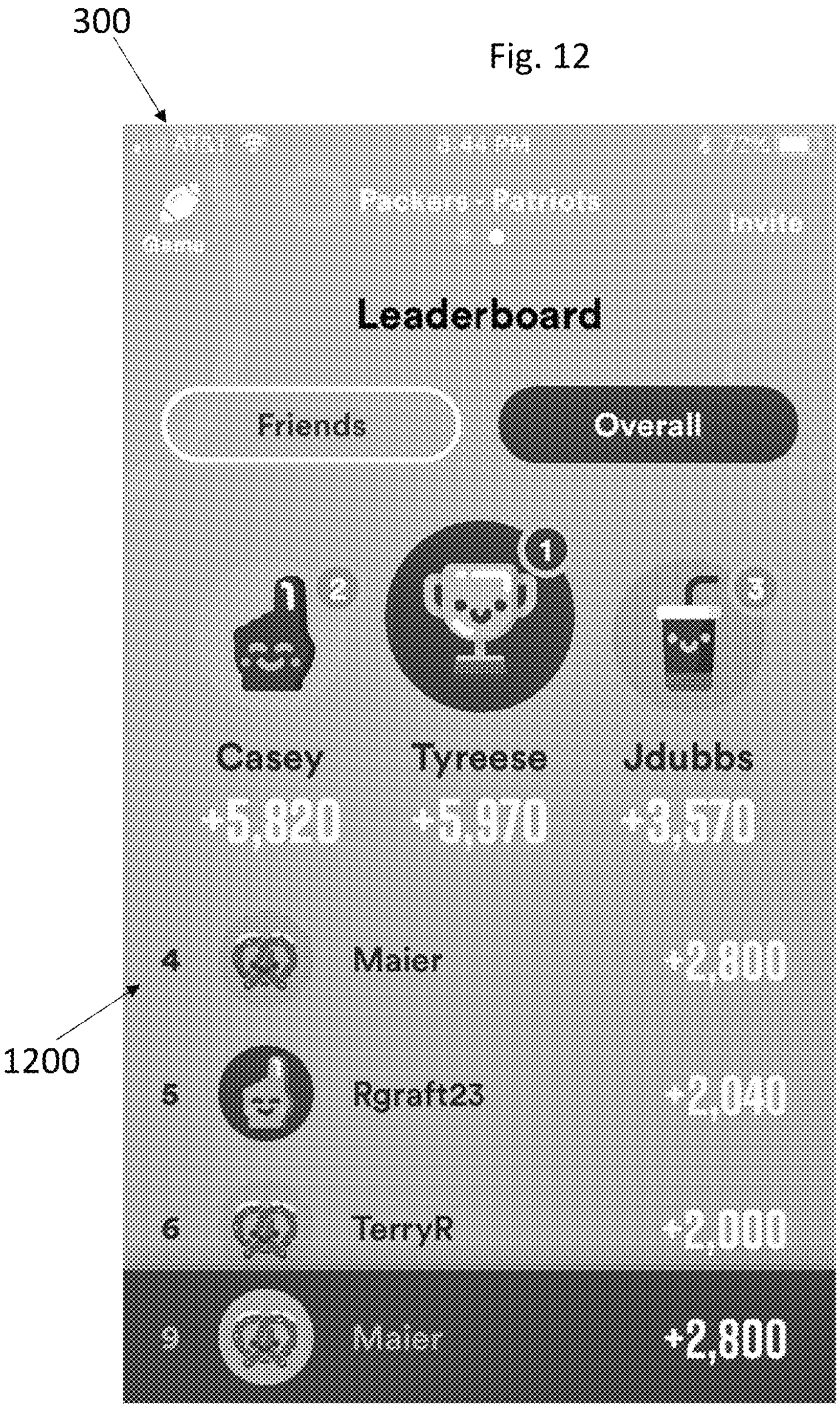
FIG. 12 is another is an exemplary diagram of an interactive computer game interface and game play leaderboard screen.
Figure 13:
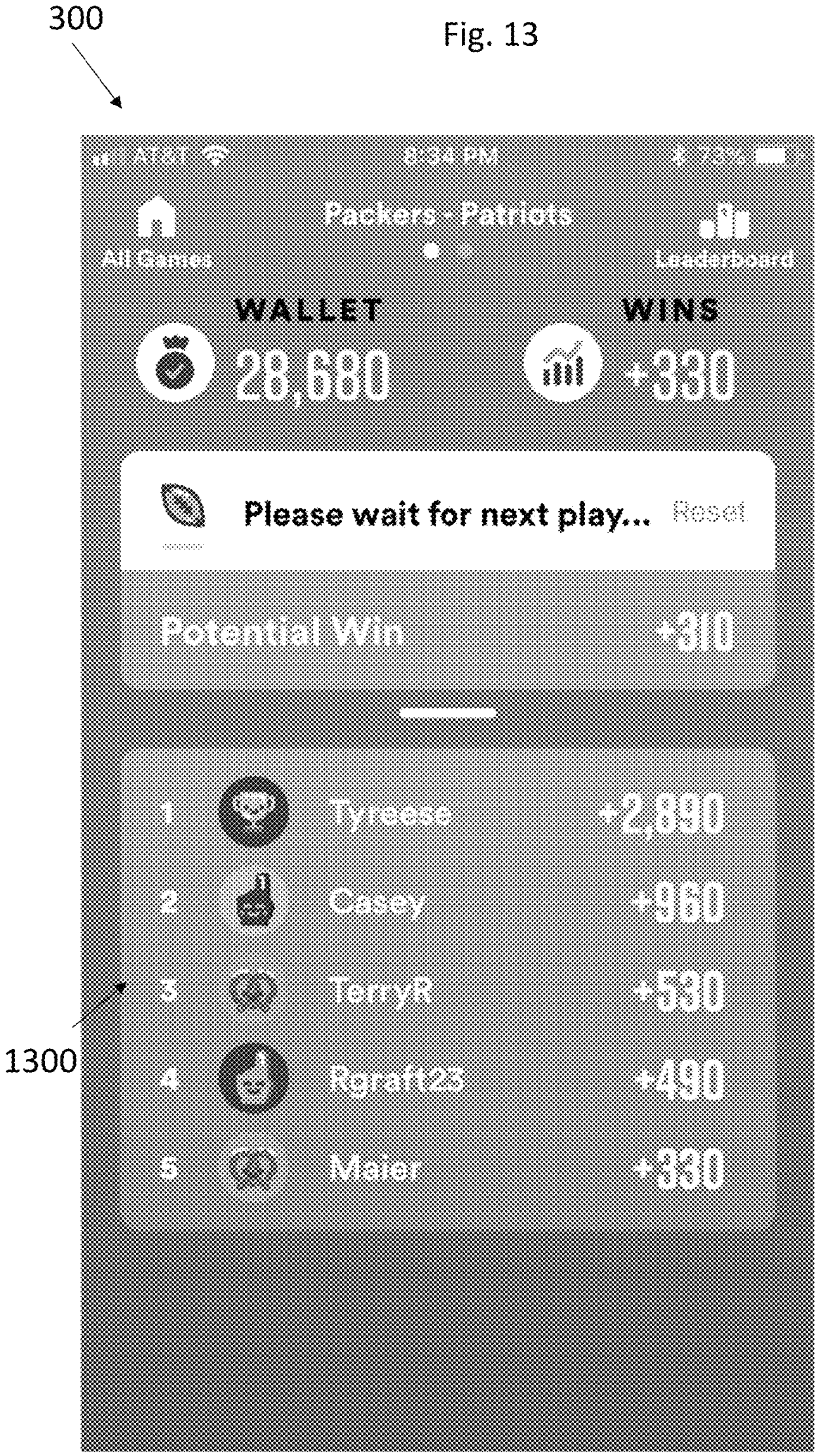
FIG. 13 is an exemplary diagram of an interactive computer game interface and game play results screen showing the results of wagers.

Following the selection of wagers and displaying of a summary screen, placeholder information 1100 may be displayed to provide players with information before new wagers become available, as seen in exemplary FIG. 11. Further, at any time, a player may select leaderboard 308 and be provided with leaderboard information 1200, as calculated in real time by the server, and as shown in exemplary FIG. 12. Additionally, after the play is executed in the football game (or other game) being played, and as shown in exemplary FIG. 13, winning amounts and scores 1300 may be displayed to the player of the interactive sports game. It may be appreciated, further to FIG. 13, that winning amounts and scores are determined by a processor associated with the server. Further, in some examples, rewards may be provided at predetermined times or based on the occurrence of an event. For example, a comparison of scores between a number of players of the interactive sports game may be made by the server. The player of the interactive game at the end of a game, for example, may be given a prize, which could include money, a digital award or recognition, or some other physical element. It is envisioned that the server could make these determinations of rewards at a variety of times, including ends of periods, quarters, or games, ends of a predetermined interval timed by the server during play of the live action game, at the end of a group of games or season, or as a result of a tournament. In another exemplary embodiment, the server may group together users to allow them to place wagers against each other or against the house. The users may be selected randomly, or based on any desired criteria, for example location, amount wagered, experience, time of play, preferred team or game, and the like. For example, the location may be data retrieved from the user's smartphone that indicates the user is in close proximity to other users. Users that are wagering a large amount may desire to be placed with other users who can match such a wager. The user's level of experience and the amount the user wagers can be extracted and/or determined from the software's history of the user. Placing users in groups with similar levels of experience may create a fairer level of play, whereas a random grouping of users may place beginners with experienced users who may take advantage of their inexperience. A user may input their preferred team or game, or the software may be able to extrapolate that data based on the number of wagers the user has placed on a team or player. Placing users together based on a preferred, desired, or favorite team may allow them to engage in a friendly conversation or banter, contributing positively to user experience in the game.

Further, the group can be specifically selected to include a user's contacts, connections, friends or a player that the user requests to play with. A further exemplary embodiment may implement a social media connection or association that may allow a user to invite another person or multiple people that the user is connected to on social media to the group. In a further embodiment, the users may communicate with each other when placed in the same group and, in some examples, tailor game play or wagering to desired or agreed-upon rules. For example, a group of users playing together may propose a new wager, increase an existing wager, or exchange banter. Each user may have the option to save another user on a "friends" list in order to later join a group or propose a wager with that user once again in the future. Users grouped based on certain criteria may interact and chat with one another, creating a desirable and engaging social environment akin to a casino or a sports bar.

In another exemplary embodiment, users may wager on the outcome of a coach's challenge to a call made by a referee. For example, if a referee in a football game determines that the ball is out of bounds, a coach may challenge that determination. Similarly, other professional and college sports, including, but not limited to, football, baseball, basketball, hockey, tennis, golf, etc., may utilize various types of "coach challenges", "official reviews", or the like where some form of video replay or off-the-field or court-of-play replay is utilized to review a play or action. The server may calculate the odds of a successful challenge based on a variety of criteria. For example, the server may consider the type of play being challenged, historical analysis of that type of play challenge, the coaches' previous challenges and related outcomes, all coaches' previous challenges and related outcomes, and/or a particular referee's previous challenges, and the like, and any combination thereof. The server may reference a coach's, team's, referee's, or league's history to determine the likelihood that there will be a reversal of the initial determination on the field. Odds may then be calculated based on the history and displayed to users, who are then prompted to make a wager, in a similar manner to that described above with respect to regular gameplay that is based on the outcome of a play or other action that takes place. Further, this wager may be prompted not only when a coach challenges a ruling, but also when the replay assistant or referees (or other designated party or official) decide to challenge a ruling or determination on the field. Further, this implementation is not limited to football and may be applied to any sport in which a referee's (or umpire's) initial determination may be reconsidered, such as basketball and baseball.

It may be appreciated that various groups of data may be referenced in calculating the odds of a wager, beyond a league, team, or player data. For example, data regarding players of the same position may be compared to determine if a player in that group is going to be successful. Further, data regarding players of a certain playing style may indicate whether that playing style will be successful in a certain situation, such as when taking other factors into consideration. Players may be grouped based on height or weight. For example, if a certain player has historically been less successful defending a player larger or smaller than him, that can be taken into consideration when odds are calculated. Other groups of data that might affect odds may include speed, age, experience, or coaching. Further, multiple groups of data may be referenced when calculating the odds of a single event or wager. Further, various other groupings, such as divisions within a league, geographic regions in a league, or the like, may further be used as a source of historical data in calculating odds of a play occurring or wager.

In still other exemplary embodiments, a "play" that is used as the basis for making a wager may be defined as a single iteration or event which gives a team or player the opportunity to carry out a single plan of action. A play may be offensive or defensive. A play can also be defined differently in different sports. For example, a play in football may start when the quarterback snaps and the players begin implementing their plan of action and may end when the ball is no longer active and the offensive player with the ball is down, thus stopping the play and allowing the teams to reconvene and implement a different plan of action.

Alternatively, a play in other sports may be interpreted in a different manner. For example, a play in basketball may begin when a team first begins their possession of the basketball and may end when the same team loses possession of the ball or when their possession is halted or severed. Events that may halt a team's possession may include a timeout, a shot after which the possessing team retains possession after by acquiring the rebound, or a foul. These events may halt the possessing team's possession, thus ending the play and beginning a new play, although they may still retain possession of the basketball. Thus, a play is different from a possession or a drive, which may involve a series of plays. In still further exemplary embodiments related to basketball or other sports, a "play" could be defined as a set period of time, a number of possessions, a quarter or other period of game action, or the like. Further, a play may not just be a team's possession of the ball but may apply to just a single player's possession of the ball or implementation of a plan of action. A player's next play may begin when the player has possession of the ball or before the player has possession of the ball when the player is making an offensive or defensive plan.

In sports such as hockey or soccer where the players are in motion for almost the entire game, a play may be a single attack on the opposing side's goal, or a single defense against such an attack. For example, a play may begin when the ball or puck crosses the halfway point of the field, and the offensive team begins executing a plan to advance the ball or puck to the opposing team's goal. A play does not need to be organized by a coach or an individual player.

In still other examples, such as golf, a play can be defined as a club stroke or a hole, for example. Likewise, in tennis, a play could be interpreted as a point beginning with ball service or even a game within a set.

The above examples of definitions of a play do not limit the definition to only those situations or sports, but rather illustrate the definition of a play as used herein. Generally, a play may be defined as an opportunity to implement a plan of action that begins when the team begins implementing the plan of action and ends when the same plan of action can no longer be continued and is either restarted or discarded in favor of an alternate plan of action. Alternatively, a play can be defined by a time period of game play action or even by a period of time outside of the game. Thus, it is envisioned that exemplary embodiments described herein can allow for users of the described exemplary embodiments to wager on various plays, actions, time periods, and the like in real time using the described software and communication devices.

Figure 14:
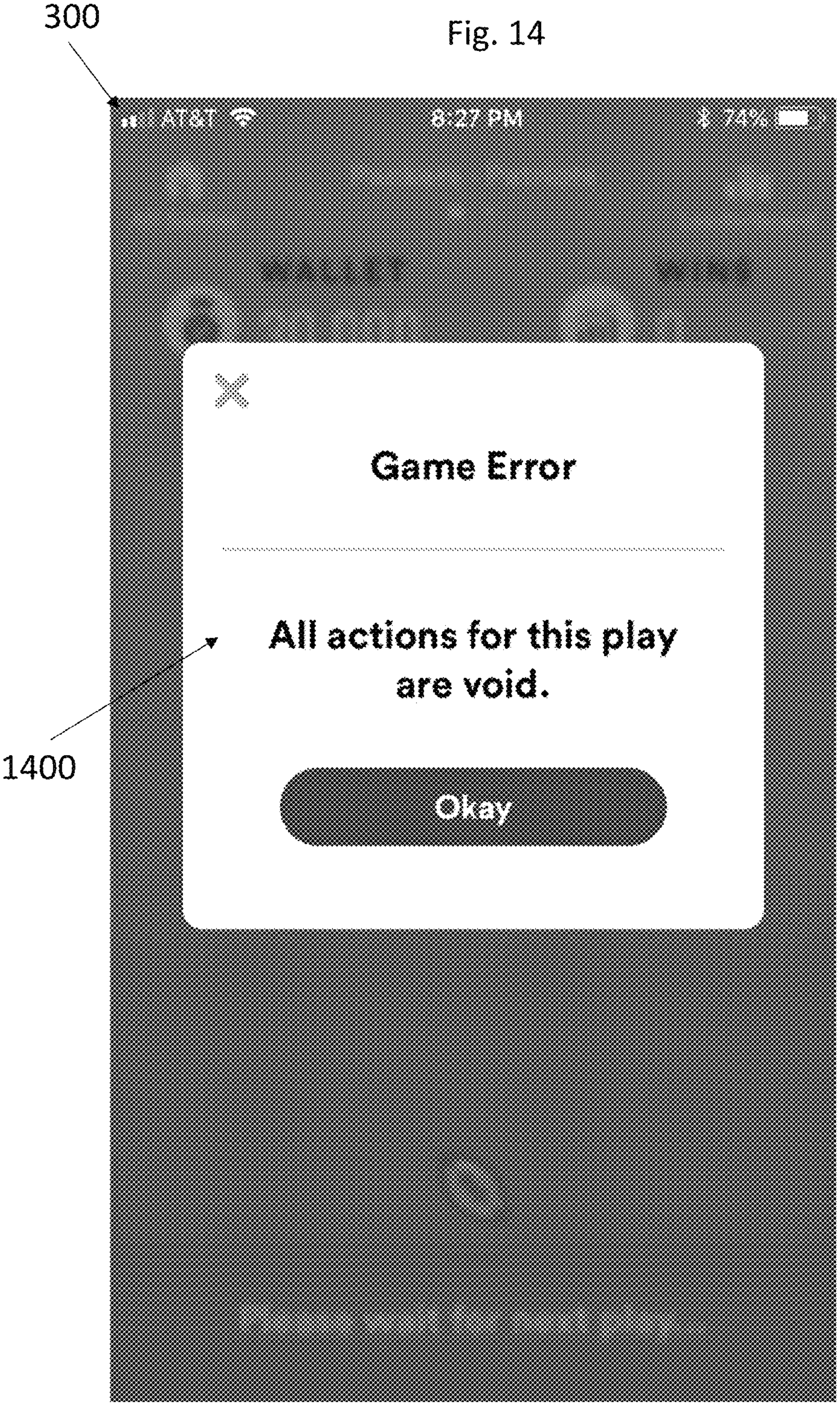
FIG. 14 is an exemplary diagram of an interactive computer game interface and game play showing an error window.

As shown in exemplary FIG. 14, pop up window 1400 may be displayed in the event of an error. An error may include a network disruption, insufficient data to determine odds and/or wager action items by the server, insufficient time between plays, penalties, or other disruptions that do not allow for game play of the interactive sports game to be executed or which stop play in the football game (or other game). Following such a game error, the users will be returned to placeholder information 1100 or to a wagering screen, as shown in exemplary FIG. 5

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented method comprising:

obtaining first information from a live event from a first source;

comparing the first information from the first source to one or more predetermined factors to determine that the first information is complete;

after the first information is incomplete, supplementing the first information from the first source;

determining, using artificial intelligence, odds related to second information based on the first information and historical information related to one or more factors in the first information; and outputting one or more wager options.

2. The computer implemented method of claim 1, wherein the one or more wager options are outputted on a communication device.

3. The computer implemented method of claim 1, wherein artificial intelligence is used to determine the outputted one or more wager options.

4. The computer implemented method of claim 1, wherein artificial intelligence is used to determine that the first information from the first source is incomplete.

5. The computer implemented method of claim 1, wherein the first information from the first source is supplemented with first information from a second source.

6. A computer implemented method comprising:

obtaining first information from a live event from a first source;

comparing the first information from the first source to one or more predetermined factors to determine that the first information is complete and, after the first information is incomplete, supplementing the first information from the first source;

determining, using artificial intelligence, odds related to second information; and outputting one or more wager options.

7. The computer implemented method of claim 6, wherein the one or more wager options are outputted on a communication device.

8. The computer implemented method of claim 6, wherein artificial intelligence is used to determine the outputted one or more wager options.

9. The computer implemented method of claim 6, wherein artificial intelligence is used to determine that the first information from the first source is incomplete.

10. The computer implemented method of claim 6, wherein the first information from the first source is supplemented with first information from a second source.

* * * * *